US012772228B2

(12) United States Patent
Zhao

(10) Patent No.: US 12,772,228 B2
(45) Date of Patent: Oct. 20, 2026

(54) SEMI-PERSISTENT SCHEDULING (SPS) TRANSMISSION INDICATION METHOD AND APPARATUS APPLIED TO MULTI-BROADCAST SCHEDULING (MBS)

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 266 days.

(21) Appl. No.: 18/693,566

(22) PCT Filed: Sep. 24, 2021

(86) PCT No.: PCT/CN2021/120474
§ 371 (c)(1),
(2) Date: Mar. 20, 2024

(87) PCT Pub. No.: WO2023/044811
PCT Pub. Date: Mar. 30, 2023

(65) Prior Publication Data
US 2024/0389091 A1 Nov. 21, 2024

(51) Int. Cl.
*H04W 72/11* (2023.01)
*H04W 72/23* (2023.01)
(Continued)

(52) U.S. Cl.
CPC ............ *H04W 72/11* (2023.01); *H04W 72/23* (2023.01); *H04W 72/30* (2023.01); *H04L 1/1822* (2013.01); *H04L 1/1896* (2013.01)

(58) Field of Classification Search
CPC ..... H04W 72/11; H04W 72/23; H04W 72/30; H04L 1/1822; H04L 1/1896
See application file for complete search history.

(56) References Cited

U.S. PATENT DOCUMENTS

2020/0314855 A1 10/2020 Lee et al.
2022/0116972 A1* 4/2022 Liu .......................... H04L 1/08
(Continued)

FOREIGN PATENT DOCUMENTS

CN 102595600 A 7/2012
CN 110536460 A 12/2019
(Continued)

OTHER PUBLICATIONS

Prasad et al. US 20240106607 in view of Li et al, "Channel Scheduling Method and Device, Apparatus and Storage Medium", Mar. 2, 2023, WO, WO 2023024930 (Year: 2023).*
(Continued)

*Primary Examiner* — Michael K Phillips
(74) *Attorney, Agent, or Firm* — Volpe Koenig

(57) ABSTRACT

A semi-persistent scheduling (SPS) transmission indication method and apparatus applied to multi-broadcast scheduling (MBS), includes: a terminal device receives SPS transmission indication signaling sent by a network-side device; and the terminal device obtains, on the basis of the SPS transmission indication signaling, a terminal device sub-group to which an SPS transmission belongs and an SPS transmission state corresponding to the terminal device sub-group to which the SPS transmission belongs.

14 Claims, 3 Drawing Sheets

(51) Int. Cl.

*H04W 72/30* (2023.01)
*H04L 1/1822* (2023.01)
*H04L 1/1867* (2023.01)

(56) References Cited

U.S. PATENT DOCUMENTS

| | | | | |
|---|---|---|---|---|
| 2022/0256554 | A1* | 8/2022 | Chen | H04W 72/0446 |
| 2024/0106607 | A1* | 3/2024 | Prasad | H04L 5/0053 |
| 2024/0187142 | A1* | 6/2024 | Lei | H04L 5/0055 |
| 2024/0276519 | A1* | 8/2024 | Lee | H04B 7/0695 |

FOREIGN PATENT DOCUMENTS

| | | | | |
|---|---|---|---|---|
| WO | 2020088441 | A1 | 5/2020 | |
| WO | 2020172764 | A1 | 9/2020 | |
| WO | 2021030980 | A1 | 2/2021 | |
| WO | WO-2023024930 | A1 * | 3/2023 | H04L 5/00 |

OTHER PUBLICATIONS

ZTE. "Enhancements for DL SPS configurations" 3GPP TSG RAN WG1 #96bis, R1-1904150, Apr. 12, 2019 (Apr. 12, 2019), entire document; Type-A.

Ericsson, "Remaining Issue of DL SPS Enhancements for NR URLLC", 3GPP TSG-RAN WG1 Meeting #100bis-e, 1 R1-2001790, Apr. 20-30, 2020, 5 pages.

* cited by examiner

SEMI-PERSISTENT SCHEDULING (SPS) TRANSMISSION INDICATION METHOD AND APPARATUS APPLIED TO MULTI-BROADCAST SCHEDULING (MBS)

CROSS-REFERENCE TO RELATED APPLICATIONS

The present application is a U.S. National Stage of International Application No. PCT/CN2021/120474, filed on PCT Sep. 24, 2021, the contents of all of which are incorporated herein by reference in their entireties for all purposes.

BACKGROUND OF THE INVENTION

In wireless communication, in order to perform a multicast-broadcast service (MBS) (multi-broadcast scheduling) service, a network-side device needs to configure a semi-persistent scheduling (SPS) configuration for terminal devices, after the SPS configuration is activated, terminal devices in the same sub-group use the SPS configuration for an SPS transmission.

SUMMARY OF THE INVENTION

The disclosure relates to the technical field of communications, in particular to a semi-persistent scheduling (SPS) transmission indication method and apparatus applied to multi-broadcast scheduling (MBS).

In a first aspect, an example of the disclosure provides a semi-persistent scheduling (SPS) transmission indication method applied to multi-broadcast scheduling (MBS), performed by a terminal device, and including:

- receiving an SPS transmission indication signaling sent by a network-side device; and
- obtaining, on the basis of the SPS transmission indication signaling, a terminal device sub-group to which an SPS transmission belongs and an SPS transmission state corresponding to the terminal device sub-group to which the SPS transmission belongs.

In a second aspect, an example of the disclosure provides another semi-persistent scheduling (SPS) transmission indication method applied to multi-broadcast scheduling (MBS), performed by a network-side device, and including:

- sending an SPS transmission indication signaling to a terminal device, where the SPS transmission indication signaling is used for indicating a terminal device sub-group to which an SPS transmission belongs and an SPS transmission state corresponding to the terminal device sub-group to which the SPS transmission belongs.

In a third aspect, an example of the disclosure provides a communication apparatus, including one or more processor and a memory, and a computer program is stored in the memory. The one or more processor executes the computer program stored in the memory, such that the first communication apparatus executes the method described in the first aspect above.

In a fourth aspect, an example of the disclosure provides a communication apparatus, including one or more processor and a memory, and a computer program is stored in the memory. The one or more processor executes the computer program stored in the memory, such that the communication apparatus executes the method described in the second aspect above.

In a fifth aspect, an example of the disclosure provides a communication apparatus, including one or more processor and an interface circuit. The interface circuit is configured to receive code instructions and transmitting the same to the one or more processor, and the one or more processor is configured to run the code instructions, such that the communication apparatus executes the method described in the first aspect above.

In a sixth aspect, an example of the disclosure provides a communication apparatus, including one or more processor and an interface circuit. The interface circuit is configured to receive code instructions and transmitting the same to the one or more processor, and the one or more processor is configured to run the code instructions, such that the communication apparatus executes the method described in the second aspect above.

In a seventh aspect, an example of the disclosure provides a semi-persistent scheduling (SPS) transmission indication system applied to multi-broadcast scheduling (MBS). The system includes the communication apparatus described in the third aspect and the communication apparatus described in the fourth aspect, or the system includes the communication apparatus described in the fifth aspect and the communication apparatus described in the sixth aspect.

In an eighth aspect, an example of the present disclosure provides a non-transitory computer-readable storage medium for storing instructions used by the terminal device above. The instructions, when executed, causes the terminal device to execute the method described in the first aspect above.

In a ninth aspect, an example of the present disclosure provides a non-transitory computer-readable storage medium for storing instructions used by the network-side device above. The instructions, when executed, causes the network-side device to execute the method described in the second aspect above.

In a tenth aspect, the disclosure further provides a computer program product including a computer program. The computer program product, when running on a computer, causes the computer to execute the method described in the first aspect above.

In an eleventh aspect, the disclosure further provides a computer program product including a computer program. The computer program product, when running on a computer, causes the computer to execute the method described in the second aspect above.

In a twelfth aspect, the disclosure provides a chip system. The chip system includes at least one processor and a interface, for supporting a terminal device in implementing the functions involved in the first aspect, for example, determining or processing at least one of data and information involved in the above method. In one possible design, the chip system further includes a memory, and the memory is used for storing needful computer programs and data for the terminal device. The chip system may be composed of a chip, and may further include the chip and other discrete devices.

In a thirteenth aspect, the disclosure provides a chip system. The chip system includes at least one processor and a interface, for supporting a network-side device in implementing the functions involved in the second aspect, for example, determining or processing at least one of data and information involved in the above method. In one possible design, the chip system further includes a memory, and the memory is used for storing needful computer programs and data for the network-side device. The chip system may be composed of a chip, and may further include the chip and other discrete devices.

In a fourteenth aspect, the disclosure provides a computer program. The computer program, when running on a computer, causes the computer to execute the method described in the first aspect above.

In a fifteenth aspect, the disclosure provides a computer program. The computer program, when running on a computer, causes the computer to execute the method described in the second aspect above.

BRIEF DESCRIPTION OF DRAWINGS

In order to more clearly illustrate technical solutions in examples of the disclosure or a background technology, accompanying drawings needing to be used in the examples of the disclosure or the background technology will be illustrated below.

DETAILED DESCRIPTION OF THE INVENTION

Specific service demands of different terminal devices may vary, and channel conditions may also be different, the terminal devices in the same sub-group using the same SPS configuration for the SPS transmission may limit flexibility of the multicast-broadcast service. In addition, if the terminal devices are re-grouped, it will result in significant transmission delay. If only one set of SPS configuration is activated on a network side, the network side cannot flexibly select terminal device groups targeted by the activated SPS according to changes in service. If a plurality of sets of SPS configurations are activated on the network side, the difference in transmission demands between the terminal devices will make mismatch between activation signaling and audiences more prominent.

For ease of understanding, terms involved in the disclosure are introduced first.

1. Multicast-Broadcast Service (MBS)

MBS is an important function of a wireless communication system defined by an IEEE802.16e protocol. MBS is divided into two cases: single base station access and multi base station access. The single base station access refers to a multicast broadcasting service within a base station, and the multi base station access refers to that all terminals registered with multicast broadcasting contents at a network level can receive multicast broadcasting services synchronously transmitted by all base stations in a downlink connection under a multicast broadcasting service area.

2. Downlink Control Information (DCI)

The DCI is carried by a physical downlink control channel (PDCCH), and the DCI may include uplink and downlink resource allocation, hybrid automatic repeat request (HARQ) information, power control, etc. The PDCCH is a physical channel used for carrying downlink scheduling information.

In order to better understand a semi-persistent scheduling (SPS) transmission indication method applied to multi-broadcast scheduling (MBS) disclosed in an example of the disclosure, the following will first describe a communication system applicable to the example of the disclosure.

Figure 1:
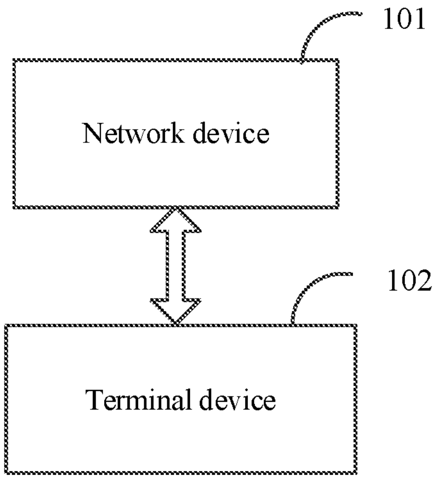
FIG. 1 is a schematic architectural diagram of a communication system provided by an example of the disclosure.

Please refer to FIG. 1, and FIG. 1 is a schematic architectural diagram of a communication system provided by an example of the disclosure. The communication system may include, but is not limited to one network-side device and one terminal device. The number and form of devices shown in FIG. 1 are merely for example and do not constitute limitation on the example of the disclosure. In practical applications, it may include two or more network-side devices and two or more terminal devices. The communication system shown in FIG. 1 includes one network-side device 101 and one terminal device 102 as an example.

3. Scrambling

Scrambling is a processing method for digital signals, which uses scrambling codes and an original signal for an XOR operation so as to obtain a new signal. The role of uplink physical channel scrambling is usually to distinguish the different terminal devices, while downlink scrambling may distinguish between a cell and a channel. The scrambling codes may be used to scramble and descramble the original signal. For example, the scrambling codes may scramble downlink control information (DCI), or may also be referred to as scrambling the PDCCH. Scrambling the DCI may specifically refer to scrambling cyclic redundancy check (CRC) fields of the DCI. Correspondingly, the terminal device descrambles the received DCI specifically refers to that the terminal device uses the corresponding type of scrambling codes to descramble the CRC field of the DCI to determine a format or type of the DCI.

The scrambling codes may include, but are not limited to: a cell radio network temporary identifier (C-RNTI), a temporary cell radio network temporary identifier (TC-RNTI), a group scheduling radio network temporary identifier (GS-RNTI) and a random access radio network temporary identifier (RA-RNTI).

It is to be noted that the technical solutions of the example of the disclosure may be applied to various communication systems, such as a long term evolution (LTE) system, a 5th generation (5G) mobile communication system, a 5G new radio (NR) system, or other future new mobile communication systems. It is further to be noted that a side link in the example of the disclosure may further be referred to as a sidelink or a through link.

The network device 101 in the example of the disclosure is an entity on a network-side side for transmitting or receiving a signal. For example, the network-side device 101 may be an evolved NodeB (eNB), a transmission reception point (TRP), a next generation NodeB (gNB) in an NR system, base stations in other future mobile communication systems, or an access node in a wireless fidelity (WiFi) system, etc. A specific technology and a specific device form employed by the network-side device are not limited by the example of the disclosure. The network-side device provided by the example of the disclosure may be composed of a central unit (CU) and a distributed unit (DU), where the CU may also be referred to as a control unit. A CU-DU structure may separate the network-side device, such as a protocol layer of the base station, with some protocol layer functions placed in the CU for centralized control, and the remaining or all protocol layer functions distributed in the DU, and the DU is centrally controlled by the CU.

The terminal device 102 in the example of the disclosure is an entity on a user side for receiving or transmitting a signal, such as a mobile phone. The terminal device may also be referred to as a terminal, user equipment (UE), a mobile station (MS), a mobile terminal (MT), etc. The terminal device may be a car with a communication function, a smart car, a mobile phone, a wearable device, a tablet computer (Pad), a computer with a wireless transceiving function, a virtual reality (VR) terminal device, an augmented reality (AR) terminal device, a wireless terminal device in industrial control, a wireless terminal device in self-driving, a wireless terminal device in remote medical surgery, a wireless terminal device in a smart grid, a wireless terminal device in transportation safety, a wireless terminal device in a smart city, a wireless terminal device in a smart home and the like. A specific technology and a specific device form employed by the terminal device are not limited by the example of the disclosure.

In the related art, for an SPS configuration of the MBS, the network side may configure a plurality of sets of SPS configurations for the terminal, but the specific service demands of different terminals may vary, and channel conditions may also vary. According to the current mechanism, once an SPS is activated, the terminals in the group need use the same SPS configuration to receive data, thus limiting the flexibility of SPS scheduling. If the terminal devices are re-grouped through radio resource control (RRC) signaling, it will result in significant transmission delay. If only one set of SPS configuration is activated on the network side, the network side cannot flexibly select terminal groups targeted by the activated SPS according to changes in service. If a plurality of sets of SPS configurations are activated on the network side, the difference in transmission demands between the terminals will make mismatch between activation signaling and audiences more prominent.

In the related art, the network side may configure one or more SPS configurations for the terminal. When the network side activates the configured SPS, only one SPS configuration can be activated at a time. However, for the MBS, one activation can merely activate the same SPS configuration for all the terminals in a sub-group, which has a problem of insufficient scheduling flexibility.

In the related art, it supports joint de-activation of the SPS by the terminal, which means the plurality of SPS configurations may be de-activated through one de-activation DCI. It can merely support the de-activation of the SPS for all the terminals in the sub-group and cannot meet the differentiated demands of the different terminals. If the devices in one sub-group have different demands for the SPS configurations, it cannot be met.

It may be understood that the communication system described by the examples of the disclosure are for the purpose of illustrating the technical solutions of the examples of the disclosure more clearly, and do not constitute limitation to the technical solutions provided by the examples of the disclosure. Those skilled in the art may know that with evolution of the system architecture and occurrence of a new service scenario, the technical solutions provided by the examples of the disclosure are also applicable for the similar technical problem.

An example of the disclosure provides a semi-persistent scheduling (SPS) transmission indication method and apparatus applied to multi-broadcast scheduling (MBS), which can be applied to an evolved NodeB (eNB), a transmission reception point (TRP), a next generation NodeB (gNB) in an NR system, base stations in other future mobile communication systems, or an access node in a wireless fidelity (WiFi) system, etc. By determining an SPS transmission state corresponding to a terminal device sub-group to which the terminal device belongs in the SPS transmission using an SPS transmission indication signaling sent by a network-side device, a problem that different SPS transmission demands of terminal devices cannot be satisfied can be avoided, thus facilitating improving the efficiency of an SPS transmission in an MBS service and saving resources.

The SPS transmission indication method and apparatus applied to the MBS provided by the disclosure are introduced below in detail with reference to the accompanying drawings.

Figure 2:
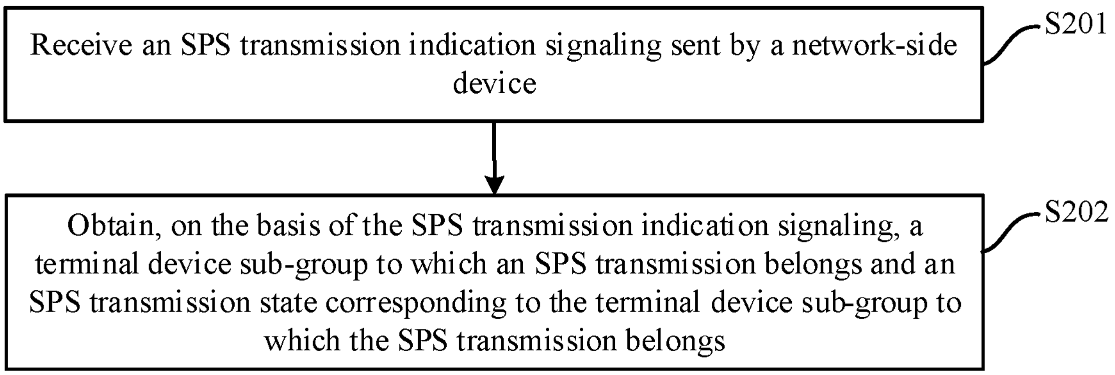
FIG. 2 is a schematic flow diagram of a semi-persistent scheduling (SPS) transmission indication method applied to multi-broadcast scheduling (MBS) provided by an example of the disclosure.

Please refer to FIG. 2, and FIG. 2 is a schematic flow diagram of a semi-persistent scheduling (SPS) transmission indication method applied to multi-broadcast scheduling (MBS) provided by an example of the disclosure. The method is performed by a terminal device. As shown in FIG. 2, the method may include, but is not limited to the following steps.

Step S201, An SPS transmission indication signaling sent by a network-side device is received.

In the example of the disclosure, the network-side device configures one or more SPS configurations for the terminal device, and meanwhile configures one or more GS-RNTIs for the terminal device. A network-side device may configure one or more terminal device sub-group IDs for terminal devices configured with the same GS-RNTI, for indicating a terminal device sub-group to which the terminal devices belong. The terminal device sub-group belongs to an MBS group.

In a possible example, a relationship between the terminal device and the terminal device sub-group configured by the network-side device is as shown in Table 1:

TABLE 1

| UE ID | Sub-group ID |
|---|---|
| #1 | {#1 #2 #3 #4} |
| #2 | {#1 #2 #4} |
| #3 | {#1 #2 #3} |
| #4 | {#1} |

Where, UE ID is ID of the terminal device, Sub-group ID is ID of the terminal device sub-group, UE #1 belongs to the terminal device sub-groups Sub-group #1, Sub-group #2, Sub-group #3, and Sub-group #4; UE #2 belongs to the terminal device sub-groups Sub-group #1, Sub-group #2, and Sub-group #4; UE #3 belongs to the terminal device sub-groups Sub-group #1, Sub-group #2, and Sub-group #3; and UE #4 belongs to the terminal device sub-group Sub-group #1. UE #1, UE #2, UE #3, and UE #4 belong to the same MBS group.

Step S202, a terminal device sub-group to which an SPS transmission belongs and an SPS transmission state corresponding to the terminal device sub-group to which the SPS transmission belongs are obtained on the basis of the SPS transmission indication signaling.

In the example of the disclosure, after receiving the SPS transmission indication signaling sent by the network-side device, the terminal device determines the terminal device sub-group to which the terminal device belongs in the SPS transmission and the SPS transmission state corresponding to the terminal device sub-group according to the SPS transmission indication signaling. The SPS transmission state may be either an activation transmission state or a de-activation transmission state.

By implementing the example of the disclosure, an SPS transmission state corresponding to a terminal device sub-group to which the terminal device belongs in the SPS transmission may be determined through an SPS transmission indication signaling sent by the network-side device, and a problem that different SPS transmission demands of terminal devices cannot be satisfied can be avoided, thus facilitating improving the efficiency of an SPS transmission in an MBS service and saving resources.

In some examples, the SPS transmission indication signaling is activation signaling, and the activation signaling includes at least one activated SPS configuration index, where each SPS configuration index corresponds to one terminal device sub-group.

In the example of the disclosure, the SPS transmission indication signaling is the activation signaling, the terminal device determines at least one activated SPS configuration index according to the activation signaling, and the activated SPS configuration and its corresponding terminal device sub-group may be determined according to the activated SPS configuration index.

In a possible implementation, the network-side device is configured with the at least one activated SPS configuration index, and a 4 bit HARQ process number (HPN) field in the activation signaling indicates the activated SPS configuration index and the terminal device sub-group corresponding to the activated SPS configuration index, which has a corresponding relationship as shown in Table 2:

TABLE 2

| Activation information bit | SPS configuration index | Sub-group set |
|---|---|---|
| 0000 | #0 | {#1 #2 #3 #4} |
| 0001 | #1 | {#1 #2 #4} |
| 0010 | #2 | {#1 #2 #3} |
| 0011 | #3 | {#1 #3 #4} |
| 0100 | #0 | {#1 #4} |
| 0101 | #1 | {#2 #3 #4} |
| 0110 | #2 | {#2 #3} |
| 0111 | #3 | {#2 #4} |
| 1000 | #0 | {#3 #4} |
| 1001 | #1 | {#4} |
| 1010 | #2 | {#3} |
| 1011 | #3 | {#2} |
| 1100 | #0 | {#1} |
| 1101 | #1 | {#1 #2} |
| 1110 | #2 | {#1 #3} |
| 1111 | #3 | {#1} |

Table 2 is an SPS configuration activation state list, where an activation information bit is a 4 bit HPN field in the above activation signaling. According to the activation information bit, a maximum of 2ˆ4=16 different SPS activation states may be configured. The SPS configuration index is an SPS configuration identifier, and Sub-group set is a terminal device sub-group corresponding to the SPS configuration index. As shown in Table 2, when the activation information bit is 0000, the SPS configuration with the SPS configuration index being #0 is activated and enters an activation state, the terminal devices contained in their corresponding Sub-group #1, Sub-group #2, Sub-group #3, and Sub-group #4 need to perform SPS transmission services according to the SPS configuration corresponding to SPS configuration index #0, that is, data in a PDSCH corresponding to the SPS is detected and received according to the SPS configuration corresponding to SPS configuration index #0.

In some examples, one activation information bit corresponds to the plurality of SPS configuration indices, that is, one activation information bit may activate the plurality of SPS configurations to enter the activation state.

In some examples, the method further includes:

receiving, when belonging to the terminal device sub-group to which the SPS transmission belongs, a physical downlink shared channel (PDSCH) of the SPS according to the SPS transmission state corresponding to the terminal device sub-group to which the SPS transmission belongs.

In the example of the disclosure, when the terminal device belongs to the terminal device sub-group to which the SPS transmission belongs, the terminal device may determine the SPS transmission state corresponding to the terminal device sub-group to which the SPS transmission belongs, and receive the corresponding PDSCH of the SPS according to the SPS transmission state.

As shown in Table 2, when the activation information bit is 0001, the SPS configuration with the SPS configuration index being #1 is activated and enters an activation state, the terminal devices contained in their corresponding Sub-group #1, Sub-group #2, and Sub-group #4 need to perform SPS transmission services according to the SPS configuration corresponding to SPS configuration index #1, that is, the data in the PDSCH corresponding to the SPS is detected and received according to the SPS configuration corresponding to SPS configuration index #1.

In some examples, the method further includes:

receiving an SPS configuration activation state list configured by the network-side device through radio resource control (RRC) signaling, where a length of the SPS configuration activation state list is L, a length of an HARQ process number (HPN) field in the activation signaling is H, and ceil ($\log_2 L$)≤H, where the SPS transmission state of the terminal device is configured according to the SPS transmission indication signaling and the SPS configuration activation state list.

In the example of the disclosure, the network-side device configures the SPS configuration activation state list for the terminal device through the radio resource control (RRC) signaling, and the SPS configuration activation state list is as shown in Table 2. When the activation information bit is 0010, the SPS configuration with the SPS configuration index being #2 is activated and enters an activation state, the terminal devices contained in their corresponding Sub-group #1, Sub-group #2, and Sub-group #3 need to perform SPS transmission services according to the SPS configuration corresponding to SPS configuration index #2, that is, the data in the PDSCH corresponding to the SPS is detected and received according to the SPS configuration corresponding to SPS configuration index #2.

In some examples, in response to determining that the network-side device simultaneously activates a plurality of SPS transmissions, and the plurality of SPS transmissions correspond to the same hybrid automatic repeat request process number (HPN) calculated by two or more PDSCHs, the HPNs respectively corresponding to the two or more PDSCHs are determined according to IDs of the terminal device sub-groups respectively corresponding to the two or more PDSCHs.

In the example of the disclosure, the network-side device simultaneously activates the plurality of SPS transmissions, and the plurality of SPS transmissions correspond to the same hybrid automatic repeat request process number (HPN) calculated by the two or more PDSCHs, that is, the HPN conflicts. In order to avoid a problem of PDSCH merging errors caused by HPN conflict, the HPNs respectively corresponding to the two or more PDSCHs are determined according to IDs of the terminal device sub-groups respectively corresponding to the two or more PDSCHs, so as to distinguish HPN values.

Figure 3:
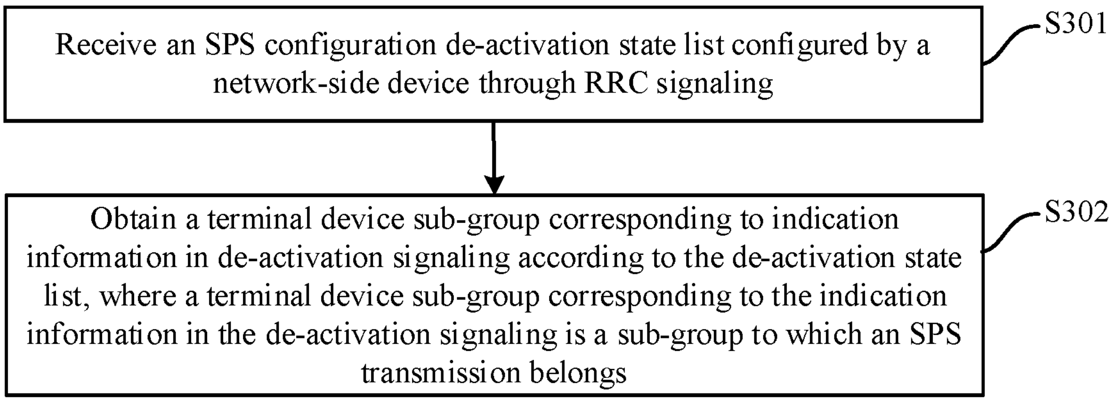
FIG. 3 is a schematic flow diagram of a semi-persistent scheduling (SPS) transmission indication method applied to multi-broadcast scheduling (MBS) provided by an example of the disclosure.

Please refer to FIG. 3, and FIG. 3 is a schematic flow diagram of a semi-persistent scheduling (SPS) transmission indication method applied to multi-broadcast scheduling (MBS) provided by an example of the disclosure. The method is performed by a terminal device. As shown in FIG. 3, the method may include, but is not limited to the following steps.

Step S301, an SPS configuration de-activation state list configured by a network-side device through RRC signaling is received.

In the example of the disclosure, the SPS transmission indication signaling is de-activation signaling, the network-side device configures the SPS configuration de-activation list for the terminal device to indicate an SPS configuration in a de-activation state and a terminal device corresponding to the SPS configuration in the de-activation state. At the same time, the network-side device configures one or more SPS configurations for the terminal device, and meanwhile configures one or more GS-RNTIs for the terminal device. A network-side device may configure one or more terminal device sub-group IDs for terminal devices configured with the same GS-RNTI, for indicating a terminal device sub-group to which the terminal devices belong. The terminal device sub-group belongs to an MBS group.

Step S302, a terminal device sub-group corresponding to indication information in de-activation signaling is obtained according to the SPS configuration de-activation state list, where the terminal device sub-group corresponding to the indication information in the de-activation signaling is a terminal device sub-group to which the SPS transmission belongs.

In the example of the disclosure, the terminal device sub-group corresponding to the indication information in the de-activation signaling is obtained according to the SPS configuration de-activation state list. The terminal device sub-group corresponding to the indication information in the de-activation signaling is the terminal device sub-group to which the SPS transmission belongs.

By implementing the example of the disclosure, an SPS transmission state corresponding to a terminal device sub-group to which a terminal device belongs in the SPS transmission may be determined through an SPS transmission indication signaling sent by the network-side device, and a problem that different SPS transmission demands of terminal devices cannot be satisfied can be avoided, thus facilitating improving the efficiency of an SPS transmission in an MBS service and saving resources.

In some examples, the method further includes:

determining a de-activation terminal device sub-group according to the de-activation signaling.

In a possible example, a relationship between the terminal device and the terminal device sub-group configured by the network-side device is as shown in Table 3:

TABLE 3

| UE ID | Sub-group ID |
|---|---|
| #1 | {#1 #2 #3 #4} |
| #2 | {#1 #2 #4} |
| #3 | {#1 #2 #3} |
| #4 | {#1} |

Where, UE ID is ID of the terminal device, Sub-group ID is ID of the terminal device sub-group, UE #1 belongs to the terminal device sub-groups Sub-group #1, Sub-group #2, Sub-group #3, and Sub-group #4; UE #2 belongs to the terminal device sub-groups Sub-group #1, Sub-group #2, and Sub-group #4; UE #3 belongs to the terminal device sub-groups Sub-group #1, Sub-group #2, and Sub-group #3; and UE #4 belongs to the terminal device sub-group Sub-group #1. UE #1, UE #2, UE #3, and UE #4 belong to the same MBS group.

In some examples, the method further includes:

indicating a terminal device sub-group corresponding to a de-activation entry according to a specific information field in the de-activation signaling.

In a possible implementation, the network-side device is configured with at least one de-activated SPS configuration index, and a specific information field, namely, a 4 bit HARQ process number (HPN) field in the de-activation signaling indicates the de-activated SPS configuration index and a terminal device sub-group corresponding to the de-activated SPS configuration index, which has a corresponding relationship as shown in Table 4:

TABLE 4

| de-Activation information bit | SPS configuration index | Sub-group set |
|---|---|---|
| 0000 | #0 #1 #2 #3 | {#1 #2 #3 #4} |
| 0001 | #0 #1 #2 | {#1 #2 #4} |
| 0010 | #0 #1 #3 | {#1 #2 #3} |
| 0011 | #0 #2 #3 | {#1} |
| 0100 | #0 #1 | {#1 #2 #3 #4} |
| 0101 | #0 #2 | {#1 #2 #4} |
| 0110 | #0 #3 | {#1 #2 #3} |
| 0111 | #1 #2 #3 | {#1} |
| 1000 | #1 #2 | {#1 #2 #3 #4} |
| 1001 | #1 #3 | {#1 #2 #4} |
| 1010 | #2 #3 | {#1 #2 #3} |
| 1011 | #0 | {#1 #2} |
| 1100 | #0 | {#1 #2 #3 #4} |
| 1101 | #1 | {#1 #2 #4} |
| 1110 | #2 | {#1 #2 #3} |
| 1111 | #3 | {#1} |

Table 4 is an SPS configuration de-activation state list, where a de-activation information bit is a 4 bit HPN field in the above de-activation signaling. According to the de-activation information bit, a maximum of 2^4=16 different SPS de-activation states may be configured. The SPS configuration index is an SPS configuration identifier, and Sub-group set is a terminal device sub-group corresponding to the SPS configuration index. As shown in Table 4, when the de-activation information bit is 0000, the SPS configuration with the SPS configuration index being #0, #1, #2 and #3 is de-activated and enters a de-activation state, the terminal devices contained in their corresponding Sub-group #1, Sub-group #2, Sub-group #3, and Sub-group #4 need to de-activate SPS transmission services corresponding to SPS configuration index #0, #1, #2 and #3.

In another impossible example, when the de-activation information bit is 0001, the SPS configuration with the SPS configuration index being #0, #1, and #2 is de-activated and enters a de-activation state, the terminal devices contained in their corresponding Sub-group #1, Sub-group #2, and Sub-group #4 need to de-activate SPS transmission services corresponding to SPS configuration index #0, #1, and #2.

In some examples, one de-activation information bit corresponds to the single SPS configuration index, that is, one de-activation information bit may de-activate the single SPS configuration to enter a de-activation state.

In some examples, the method further includes:

indicating a terminal device sub-group immune to a de-activation entry according to the specific information field in the de-activation signaling.

In the example of the disclosure, the terminal device indicates to determine the terminal device sub-group corresponding to the de-activation entry indicated by the de-activation signaling according to the specific information field, and the specific information field is a relevant information field in de-activation DCI that is not used for de-activation validation. Where the de-activation DCI can be referred to as de-activation signaling.

If one de-activation DCI can merely be used to deactivate one SPS transmission, the relevant information field that is not used for de-activation validation is one or more other information fields except for the following bit fields: an HARQ process number (HPN), a redundancy version (RV), a modulation and coding scheme (MACS), and a frequency domain resource allocation (RDRA).

If one de-activation DCI is used to de-activate the plurality of SPS transmissions, the relevant information field that is not used for de-activation validation is one or more other information fields except for the following bit fields: an information field, a redundancy version, a modulation and coding scheme, and a frequency domain resource assignment.

In some examples, the terminal device sub-group immune to the de-activation entry indicated by the de-activation signaling is: the SPS transmission corresponding to the terminal device sub-group corresponding to the indication information in the de-activation signaling being still in an activated state.

If one de-activation DCI can merely be used to deactivate one SPS transmission, the relevant information field that is not used for de-activation validation is one or more other information fields except for the following bit fields: an HARQ process number, a redundancy version, a modulation and coding scheme, and a frequency domain resource assignment.

In some examples, the specific information field is an information field being not used for de-activation validation in the de-activation signaling.

If one de-activation DCI is used to de-activate the plurality of SPS transmissions, the relevant information field that is not used for de-activation validation is one or more other information fields except for the following bit fields: an information field, a redundancy version, a modulation and coding scheme, and a frequency domain resource assignment.

An example of the disclosure also provides a semi-persistent scheduling (SPS) transmission indication method applied to multi-broadcast scheduling (MBS), the method is performed by a network-side device. The method is applied to a network-side device. The method may include, but is not limited to the following steps:

SPS transmission indication signaling is sent to a terminal device, where the SPS transmission indication signaling is used for indicating a terminal device sub-group to which an SPS transmission belongs and an SPS transmission state corresponding to the terminal device sub-group to which the SPS transmission belongs.

In the example of the disclosure, the network-side device configures one or more SPS configurations for the terminal device through the SPS transmission indication signaling, and meanwhile configures one or more GS-RNTIs for the terminal device. A network-side device may configure one or more terminal device sub-groups for terminal devices configured with the same GS-RNTI, for indicating a terminal device sub-group to which the terminal devices belong. The terminal device sub-group belongs to an MBS group.

In a possible example, a relationship between the terminal device and the terminal device sub-group configured by the network-side device is as shown in Table 5:

TABLE 5

| UE ID | Sub-group ID |
|---|---|
| #1 | {#1 #2 #3 #4} |
| #2 | {#1 #2 #4} |
| #3 | {#1 #2 #3} |
| #4 | {#1} |

Where, UE ID is ID of the terminal device, Sub-group ID is ID of the terminal device sub-group, UE #1 belongs to the terminal device sub-groups Sub-group #1, Sub-group #2, Sub-group #3, and Sub-group #4; UE #2 belongs to the terminal device sub-groups Sub-group #1, Sub-group #2, and Sub-group #4; UE #3 belongs to the terminal device sub-groups Sub-group #1, Sub-group #2, and Sub-group #3; and UE #4 belongs to the terminal device sub-group Sub-group #1. UE #1, UE #2, UE #3, and UE #4 belong to the same MBS group.

By implementing the example of the disclosure, an SPS transmission state corresponding to a terminal device sub-group to which a terminal device belongs in the SPS transmission may be determined through an SPS transmission indication signaling sent by the network-side device, and a problem that different SPS transmission demands of terminal devices cannot be satisfied can be avoided, thus facilitating improving the efficiency of an SPS transmission in an MBS service and saving resources.

In some examples, the SPS transmission indication signaling is activation signaling, and the activation signaling includes at least one activated SPS configuration index, where each SPS configuration index corresponds to one terminal device sub-group.

In the example of the disclosure, the SPS transmission indication signaling is the activation signaling, the terminal device determines at least one activated SPS configuration index according to the activation signaling, and the activated SPS configuration and its corresponding terminal device sub-group may be determined according to the activated SPS configuration index.

In a possible implementation, the network-side device is configured with the at least one activated SPS configuration index, and a 4 bit HARQ process number (HPN) field in the activation signaling indicates the activated SPS configuration index and the terminal device sub-group corresponding to the activated SPS configuration index, which has a corresponding relationship as shown in Table 6:

TABLE 6

| Activation information bit | SPS configuration index | Sub-group set |
|---|---|---|
| 0000 | #0 | {#1 #2 #3 #4} |
| 0001 | #1 | {#1 #2 #4} |
| 0010 | #2 | {#1 #2 #3} |
| 0011 | #3 | {#1 #3 #4} |
| 0100 | #0 | {#1 #4} |
| 0101 | #1 | {#2 #3 #4} |
| 0110 | #2 | {#2 #3} |
| 0111 | #3 | {#2 #4} |
| 1000 | #0 | {#3 #4} |
| 1001 | #1 | {#4} |
| 1010 | #2 | {#3} |
| 1011 | #3 | {#2} |
| 1100 | #0 | {#1} |
| 1101 | #1 | {#1 #2} |
| 1110 | #2 | {#1 #3} |
| 1111 | #3 | {#1} |

Table 6 is an SPS configuration activation state list, where an activation information bit is a 4 bit HPN field in the above activation signaling. According to the activation information bit, a maximum of 2^4=16 different SPS activation states may be configured. The SPS configuration index is an SPS configuration identifier, and Sub-group set is a terminal device sub-group corresponding to the SPS configuration index. As shown in Table 6, when the activation information bit is 0000, the SPS configuration with the SPS configuration index being #0 is activated and enters an activation state, the terminal devices contained in their corresponding Sub-group #1, Sub-group #2, Sub-group #3, and Sub-group #4 need to perform SPS transmission services according to the SPS configuration corresponding to SPS configuration index #0, that is, data in a PDSCH corresponding to the SPS is detected and received according to the SPS configuration corresponding to SPS configuration index #0.

In some examples, one activation information bit corresponds to the plurality of SPS configuration indices, that is, one activation information bit may activate the plurality of SPS configurations to enter the activation state.

In some examples, the method further includes:

sending an SPS configuration activation state list to the terminal device through RRC signaling, where a length of the SPS configuration activation state list is L, a length of an HARQ process number (HPN) field in the activation signaling is H, and ceil ($\log_2 L$)≤H.

In the example of the disclosure, the network-side device configures the SPS configuration activation state list for the terminal device through the radio resource control (RRC) signaling, and the SPS configuration activation state list is as shown in Table 2. When the activation information bit is 0010, the SPS configuration with the SPS configuration index being #2 is activated and enters an activation state, the terminal devices contained in their corresponding Sub-group #1, Sub-group #2, and Sub-group #3 need to perform SPS transmission services according to the SPS configuration corresponding to SPS configuration index #2, that is, the data in the PDSCH corresponding to the SPS is detected and received according to the SPS configuration corresponding to SPS configuration index #2.

In some examples, in response to determining that the network-side device simultaneously activates a plurality of SPS transmissions, and the plurality of SPS transmissions correspond to the same hybrid automatic repeat request process number (HPN) calculated by two or more PDSCHs, the HPNs respectively corresponding to the two or more PDSCHs are determined according to terminal device sub-group IDs respectively corresponding to the two or more PDSCHs.

In the example of the disclosure, the network-side device simultaneously activates the plurality of SPS transmissions, and the plurality of SPS transmissions correspond to the same hybrid automatic repeat request process number (HPN) calculated by the two or more PDSCHs, that is, the HPN conflicts. In order to avoid a problem of PDSCH merging errors caused by HPN conflict, the HPNs respectively corresponding to the two or more PDSCHs are determined according to IDs of the terminal device sub-groups respectively corresponding to the two or more PDSCHs, so as to distinguish HPN values.

In some examples, the method further includes:

sending an SPS configuration de-activation state list to the terminal device through RRC signaling.

In the example of the disclosure, the SPS transmission indication signaling is de-activation signaling, the network-side device configures the SPS configuration de-activation list for the terminal device through the RRC signaling to indicate an SPS configuration in a de-activation state and a terminal device corresponding to the SPS configuration in the de-activation state. At the same time, the network-side device configures one or more SPS configurations for the terminal device, and meanwhile configures one or more GS-RNTIs for the terminal device. A network side may configure one or more terminal device sub-group IDs for terminal devices configured with the same GS-RNTI, for indicating a terminal device sub-group to which the terminal devices belong. The terminal device sub-group belongs to an MBS group.

In a possible example, a relationship between the terminal device and the terminal device sub-group configured by the network-side device is as shown in Table 7:

TABLE 7

| UE ID | Sub-group ID |
|---|---|
| #1 | {#1 #2 #3 #4} |
| #2 | {#1 #2 #4} |
| #3 | {#1 #2 #3} |
| #4 | {#1} |

Where, UE ID is ID of the terminal device, Sub-group ID is ID of the terminal device sub-group, UE #1 belongs to the terminal device sub-groups Sub-group #1, Sub-group #2, Sub-group #3, and Sub-group #4; UE #2 belongs to the terminal device sub-groups Sub-group #1, Sub-group #2, and Sub-group #4; UE #3 belongs to the terminal device sub-groups Sub-group #1, Sub-group #2, and Sub-group #3; and UE #4 belongs to the terminal device sub-group Sub-group #1. UE #1, UE #2, UE #3, and UE #4 belong to the same MBS group.

In a possible implementation, the network-side device is configured with at least one de-activated SPS configuration index, and a specific information field, namely, a 4 bit HARQ process number (HPN) field in the de-activation signaling indicates the de-activated SPS configuration index and a terminal device sub-group corresponding to the de-activated SPS configuration index, which has a corresponding relationship as shown in Table 8:

TABLE 8

| de-Activation information bit | SPS configuration index | Sub-group set |
|---|---|---|
| 0000 | #0 #1 #2 #3 | {#1 #2 #3 #4} |
| 0001 | #0 #1 #2 | {#1 #2 #4} |
| 0010 | #0 #1 #3 | {#1 #2 #3} |
| 0011 | #0 #2 #3 | {#1} |
| 0100 | #0 #1 | {#1 #2 #3 #4} |
| 0101 | #0 #2 | {#1 #2 #4} |
| 0110 | #0 #3 | {#1 #2 #3} |
| 0111 | #1 #2 #3 | {#1} |
| 1000 | #1 #2 | {#1 #2 #3 #4} |
| 1001 | #1 #3 | {#1 #2 #4} |
| 1010 | #2 #3 | {#1 #2 #3} |
| 1011 | #0 | {#1 #2} |
| 1100 | #0 | {#1 #2 #3 #4} |
| 1101 | #1 | {#1 #2 #4} |
| 1110 | #2 | {#1 #2 #3} |
| 1111 | #3 | {#1} |

Table 8 is an SPS configuration de-activation state list, where a de-activation information bit is a 4 bit HPN field in the above de-activation signaling. According to the de-activation information bit, a maximum of $2^4=16$ different SPS de-activation states may be configured. The SPS configuration index is an SPS configuration identifier, and Sub-group set is a terminal device sub-group corresponding to the SPS configuration index. As shown in Table 8, when the de-activation information bit is 0000, the SPS configuration with the SPS configuration index being #0, #1, #2 and #3 is de-activated and enters a de-activation state, the terminal devices contained in their corresponding Sub-group #1, Sub-group #2, Sub-group #3, and Sub-group #4 need to de-activate SPS transmission services corresponding to SPS configuration index #0, #1, #2 and #3.

In some examples, the indication information in the de-activation signaling is used for de-activating an SPS transmission belonging to a specific sub-group terminal device.

In another impossible example, when the de-activation information bit is 0001, the SPS configuration with the SPS configuration index being #0, #1, and #2 is de-activated and enters a de-activation state, the terminal devices contained in their corresponding Sub-group #1, Sub-group #2, and Sub-group #4 need to de-activate SPS transmission services corresponding to SPS configuration index #0, #1, and #2.

In some examples, one de-activation information bit corresponds to the single SPS configuration index, that is, one de-activation information bit may de-activate the single SPS configuration to enter a de-activation state.

In some examples, the indication information in the de-activation signaling is: a specific information field in the de-activation signaling, where the specific information field is used for indicating a terminal device sub-group corresponding to a de-activation entry or a terminal device sub-group immune to the de-activation entry.

In the example of the disclosure, the terminal device indicates to determine the terminal device sub-group corresponding to the de-activation entry indicated by the de-activation signaling according to the specific information field, and the specific information field is a relevant information field being not used for de-activation validation in the de-activation signaling.

If one de-activation DCI can merely be used to deactivate one SPS transmission, the relevant information field that is not used for de-activation validation is one or more information fields except for the following bit fields: an HARQ process number, a redundancy version, a modulation and coding scheme, and a frequency domain resource assignment.

If one de-activation DCI is used to de-activate the plurality of SPS transmissions, the relevant information field that is not used for de-activation validation is one or more other information fields except for the following bit fields: an information field, a redundancy version, a modulation and coding scheme, and a frequency domain resource assignment.

In some examples, the specific information field is an information field being not used for de-activation validation in the de-activation signaling.

If one de-activation DCI is used to de-activate the plurality of SPS transmissions, the relevant information field that is not used for de-activation validation is one or more other information fields except for the following bit fields: an information field, a redundancy version, a modulation and coding scheme, and a frequency domain resource assignment.

In some examples, the terminal device sub-group immune to the de-activation entry indicated by the de-activation signaling is: the SPS transmission corresponding to the terminal device sub-group corresponding to the indication information in the de-activation signaling being still in an activated state.

If one de-activation DCI can merely be used to deactivate one SPS transmission, the relevant information field that is not used for de-activation validation is one or more other information fields except for the following bit fields: an HARQ process number, a redundancy version, a modulation and coding scheme, and a frequency domain resource assignment.

In the above examples provided by the disclosure, the methods provided by the example of the disclosure are respectively introduced from the perspectives of the network-side device and the terminal device. In order to implement the various functions in the methods provided by the examples of the disclosure, the network-side device and the terminal device may include a hardware structure and a software module, and the above various functions are implemented in the form of the hardware structure, the software module, or the hardware structure with the software module. One of the above various functions may be executed in the form of the hardware structure, the software module, or the hardware structure with the software module.

Figure 6:
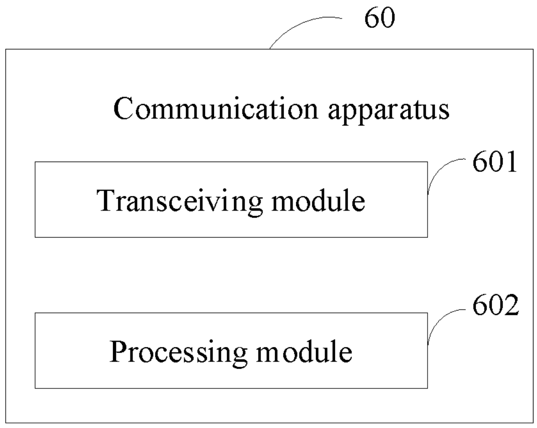
FIG. 6 is a schematic structural diagram of a communication apparatus provided by an example of the disclosure.

Please refer to FIG. 6, and FIG. 6 is a schematic structural diagram of a communication apparatus 60 provided by an example of the disclosure. The communication apparatus 60 shown in FIG. 6 may include a transceiving module 601 and a processing module 602. The transceiving module 601 may include a sending module and/or a receiving module. The sending module is configured to implement a sending function, the receiving module is configured to implement a receiving function, and the transceiving module 601 may implement the sending function and/or the receiving function.

The communication apparatus 60 may be a terminal device (such as the terminal device in the aforementioned method example), or an apparatus in the terminal device, or an apparatus that can be matched with the terminal device for use. Or, the communication apparatus 60 may be a network-side device, or an apparatus in the network-side device, or an apparatus that can be matched with the network-side device for use.

Figure 4:
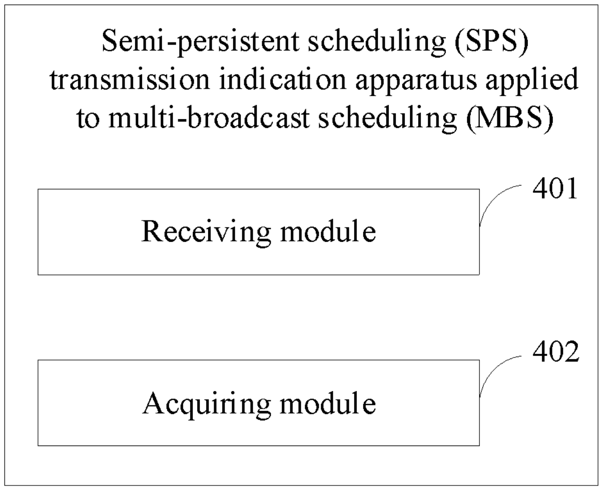
FIG. 4 is a schematic structural diagram of a semi-persistent scheduling (SPS) transmission indication apparatus applied to multi-broadcast scheduling (MBS) provided by an example of the disclosure.

The communication apparatus 60 is the terminal device. As shown in FIG. 4, FIG. 4 is a schematic structural diagram of a semi-persistent scheduling (SPS) transmission indication apparatus applied to multi-broadcast scheduling (MBS) provided by an example of the disclosure. The terminal device includes:

a receiving module 410, configured to receive an SPS transmission indication signaling sent by a network-side device; and an obtaining module 420, configured to obtain, on the basis of the SPS transmission indication signaling, a terminal device sub-group to which an SPS transmission belongs and an SPS transmission state corresponding to the terminal device sub-group to which the SPS transmission belongs.

In some examples, the SPS transmission indication signaling is activation signaling, and the activation signaling includes at least one activated SPS configuration index, where each SPS configuration index corresponds to one terminal device sub-group.

In some examples, the apparatus further includes:

a first receiving submodule, configured to receive, when belonging to the terminal device sub-group to which the SPS transmission belongs, a physical downlink shared channel (PDSCH) of the SPS according to the SPS transmission state corresponding to the terminal device sub-group to which the SPS transmission belongs.

In some examples, the apparatus further includes:

a second receiving submodule, configured to receive an SPS configuration activation state list configured by the network-side device through radio resource control (RRC) signaling, where a length of the SPS configuration activation state list is L, a length of an HARQ process number (HPN) field in the activation signaling is H, and ceil $(\log_2 L) \leq H$, where the SPS transmission state of the terminal device is configured according to the SPS transmission indication signaling and the SPS configuration activation state list.

In some examples, the apparatus further includes:

a first determining submodule, configured to determine, in response to determining that the network-side device simultaneously activates a plurality of SPS transmissions, and the plurality of SPS transmissions correspond to the same hybrid automatic repeat request process number (HPN) calculated by two or more PDSCHs, the HPNs respectively corresponding to the two or more PDSCHs according to IDs of the terminal device sub-groups respectively corresponding to the two or more PDSCHs.

In some examples, the SPS transmission indication signaling is de-activation signaling, and the obtaining module includes:

a third receiving submodule, configured to receive an SPS configuration de-activation state list configured by the network-side device through the RRC signaling; and an obtaining submodule, configured to obtain a terminal device sub-group corresponding to indication information in the de-activation signaling according to the SPS configuration de-activation state list, where the terminal device sub-group corresponding to the indication information in the de-activation signaling is the terminal device sub-group to which the SPS transmission belongs.

In some examples, the apparatus further includes:

a second determining submodule, configured to determine de-activation terminal device sub-group according to the de-activation signaling.

In some examples, the apparatus further includes:

a first indication submodule, configured to indicate a terminal device sub-group corresponding to a de-activation entry according to a specific information field in the de-activation signaling.

In some examples, the apparatus further includes:

a second indication submodule, configured to indicate a terminal device sub-group immune to the de-activation entry according to the specific information field in the de-activation signaling.

In some examples, the terminal device sub-group immune to the de-activation entry indicated by the de-activation signaling is: the SPS transmission corresponding to the terminal device sub-group corresponding to indication information in the de-activation signaling being still in an activated state.

In some examples, the specific information field is an information field being not used for de-activation validation in the de-activation signaling.

In some examples, the specific information field is an information field being not used for de-activation validation in de-activation signaling.

Figure 5:
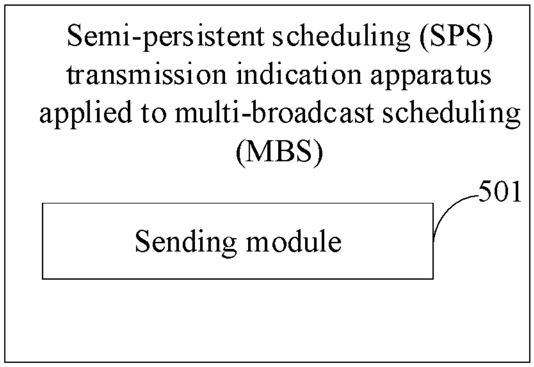
FIG. 5 is a schematic structural diagram of a semi-persistent scheduling (SPS) transmission indication apparatus applied to multi-broadcast scheduling (MBS) provided by an example of the disclosure.

The communication apparatus 60 is a network-side device. As shown in FIG. 5, FIG. 5 is a schematic structural diagram of a semi-persistent scheduling (SPS) transmission indication apparatus applied to multi-broadcast scheduling (MBS) provided by an example of the disclosure. The network-side device includes:

a sending module 50, configured to send an SPS transmission indication signaling to a terminal device, where the SPS transmission indication signaling is used for indicating a terminal device sub-group to which an SPS transmission belongs and an SPS transmission state corresponding to the terminal device sub-group to which the SPS transmission belongs.

In some examples, the SPS transmission indication signaling is activation signaling, and the activation signaling includes at least one activated SPS configuration index, where each SPS configuration index corresponds to one terminal device sub-group.

In some examples, the apparatus further includes:

a first sending submodule, configured to send an SPS configuration activation state list to the terminal device through RRC signaling, where a length of the SPS configuration activation state list is L, a length of an HARQ process number (HPN) field in the activation signaling is H, and ceil $(\log_2 L) \leq H$.

In some examples, the apparatus further includes:

a determining submodule, configured to determine, in response to determining that the network-side device simultaneously activates a plurality of SPS transmissions, and the plurality of SPS transmissions correspond to the same hybrid automatic repeat request process number (HPN) calculated by two or more PDSCHs, the HPNs respectively corresponding to the two or more PDSCHs according to sub-group IDs respectively corresponding to the two or more PDSCHs.

In some examples, the SPS transmission indication signaling is de-activation signaling, and obtaining, the apparatus further includes:

a second sending submodule, configured to send an SPS configuration de-activation state list to the terminal device through the RRC signaling.

In some examples, the indication information in the de-activation signaling is used for de-activating an SPS transmission belonging to a specific sub-group terminal device.

In some examples, the indication information in the de-activation signaling is: a specific information field in the de-activation signaling, where the specific information field is used for indicating a terminal device sub-group corresponding to a de-activation entry or a terminal device sub-group immune to the de-activation entry.

In some examples, the specific information field is an information field being not used for de-activation validation in the de-activation signaling.

In some examples, the terminal device sub-group immune to the de-activation entry indicated by the de-activation signaling is: the SPS transmission corresponding to the terminal device sub-group corresponding to indication information in the de-activation signaling being still in an activated state.

Figure 7:
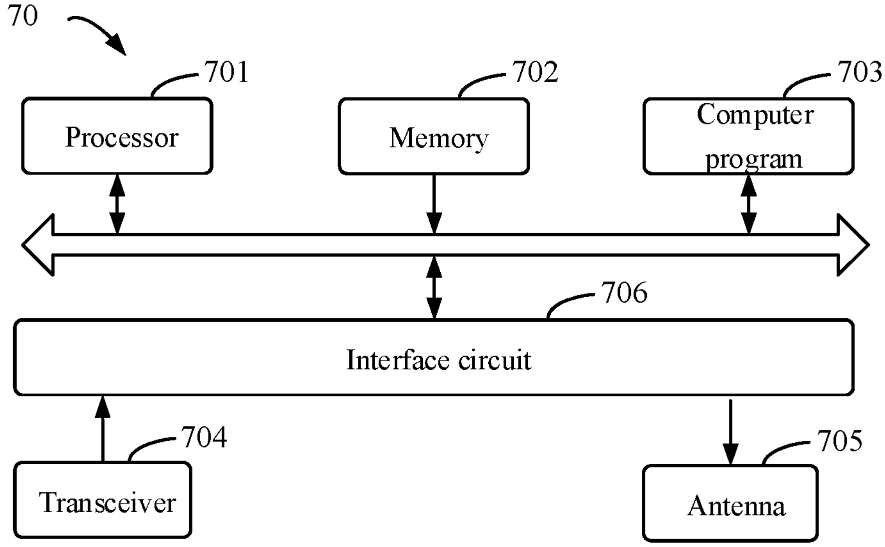
FIG. 7 is a schematic structural diagram of a communication apparatus provided by an example of the disclosure.

Please refer to FIG. 7, and FIG. 7 is a schematic structural diagram of another communication apparatus 70 provided by an example of the disclosure. The communication apparatus 70 may be a network-side device, may also be a terminal device (such as the terminal device in the aforementioned method example), may also be a chip, chip system, or processor that supports the network-side device to implement the methods above, and may further be a chip, chip system, or processor that supports the terminal device to implement the methods above. This apparatus may be used for implementing the methods described in the above method examples, which may specifically refer to illustration in the above method examples.

The communication apparatus 70 may include one or more processors 701. The processor 701 may be a general-purpose processor or a dedicated processor. For example, it may be a baseband processor or a central processing unit. The baseband processor may be used for processing a communication protocol and communication data, while the central processing unit may be used for controlling the communication apparatus (such as a base station, a baseband chip, a terminal device, a terminal device chip, and a DU or CU), executing a computer program, and processing data from the computer program.

In some examples, the communication apparatus 70 may further include one or more memories 702 on which a computer program 703 can be stored, and the processor 701 executes the computer program 703 to cause the communication apparatus 70 to execute the methods described in the above method examples. In some examples, the memory 702 may further store data. The communication apparatus 70 and the memory 702 may be arranged separately or integrated together.

In some examples, the communication apparatus 70 may further include a transceiver 704 and an antenna 705. The transceiver 704 may be referred to as a transceiving unit, a transceiving machine, or a transceiving circuit, etc., used for achieving a transceiving function. The transceiver 704 may include a receiver and a transmitter, and the receiver may be referred to as a receiving machine or a receiving circuit, for achieving a receiving function; and the transmitter may be referred to as a transmitting machine or a transmitting circuit, for achieving a transmitting function.

In some examples, the communication apparatus 70 may further include one or more interface circuits 706. The interface circuit 706 is configured to receive code instructions and transmitting the same to the processor 701. The processor 701 runs the code instructions to cause the communication apparatus 70 to execute the method described in the above method examples.

The communication apparatus 70 is a terminal device: the processor 701 is configured to execute step S202 in FIG. 2, and execute step S302 and step S302 in FIG. 3. The transceiver 704 is configured to execute step S201 in FIG. 2.

In one implementation, the processor 701 may include a transceiver for implementing receiving and transmitting functions. For example, the transceiver may be a transceiving circuit, an interface, or an interface circuit. The transceiving circuit, interface, or interface circuit used for achieving the receiving and transmitting functions may be separate or integrated together. The above transceiving circuit, interface, or interface circuit can be used for reading and writing codes/data, or the above transceiving circuit, interface, or interface circuit may be used for signal transmission or transferring.

In one implementation, the processor 701 may store a computer program 703, the computer program 703 runs on the processor 701, to cause the communication apparatus 70 to execute the methods described in the above method examples. The computer program 703 may be embedded in the processor 701, in which case the processor 701 may be implemented by hardware.

In one implementation, the communication apparatus 70 may include a circuit, and the circuit may achieve the functions of transmitting, receiving, or communicating in the aforementioned method examples. The processor and transceiver described in the disclosure may be implemented on an integrated circuit (IC), an analog IC, a radio frequency integrated circuit (RFIC), a mixed signal IC, an application specific integrated circuit (ASIC), a printed circuit board (PCB), an electronic device, and the like. The processor and transceiver may also be manufactured using various IC process technologies, such as a complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

The communication apparatus described in the above examples may be a network-side device or a terminal device (such as the terminal device in the aforementioned method example), but the scope of the communication apparatus described in the disclosure is not limited to this. The structure of the communication apparatus may be not limited by FIG. 7. The communication apparatus may be an independent device or may be part of a larger device. For example, the communication apparatus may be:

(1) an independent integrated circuit (IC), or a chip, or a chip system or a subsystem;

(2) a set of one or more ICs, in some examples the IC set including a storage component for storing data and a computer program;

(3) an ASIC, such as a modem;

(4) a module that can be embedded in other devices;

(5) a receiving machine, a terminal device, an intelligent terminal device, a cellular phone, a wireless device, a handheld machine, a mobile unit, an on-board device, a network-side device, a cloud device, an artificial intelligence devices, etc.; and (6) others and so on.

Figure 8:
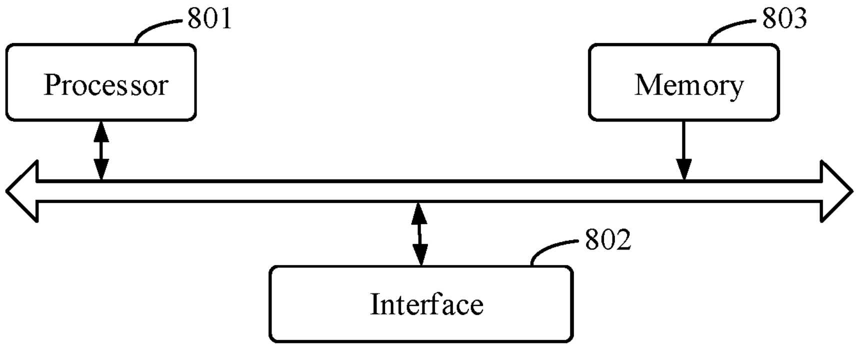
FIG. 8 is a schematic structural diagram of a chip provided by an example of the disclosure.

For a case that the communication apparatus may be a chip or a chip system, please refer to a schematic structural diagram of a chip shown in FIG. 8. The chip shown in FIG. 8 includes a processor 801 and an interface 802. The number of the processor 801 may be one or more, and the number of the interfaces 802 may be multiple.

In some examples, the chip further includes a memory 803, and the memory 803 is configured to store the needful computer program and data.

The skilled in the art can further understand that the various illustrative logical blocks and steps listed in the example of the disclosure may be implemented through electronic hardware, computer software, or a combination of the two. Whether such functions are implemented through hardware or software depends on the specific application and design requirements of the overall system. The skilled in the art can use various methods to achieve the described functions for each specific application, but such implementation needs not be understood as exceeding the scope of protection of the example of the disclosure.

An example of the disclosure further provides a semi-persistent scheduling (SPS) transmission indication system for multi-broadcast scheduling (MBS). The system includes a communication apparatus as a terminal device (such as the terminal device in the aforementioned method example) in the aforementioned example of FIG. 6 and a communication apparatus as a network-side device, or the system includes a communication apparatus as a terminal device (such as the terminal device in the aforementioned method example) in the aforementioned example of FIG. 7 and a communication apparatus as a network-side device.

The disclosure further provides a readable storage medium on which instructions are stored, and the instructions, when executed by a computer, implement the functions of any of the above method examples.

The disclosure further provides a computer program product, and the computer program product, when executed by a computer, implements the functions of any of the above method examples.

In the above examples, it can be fully or partially implemented through software, hardware, firmware, or any combination of them. When implemented using the software, it can be fully or partially implemented in a form of the computer program product. The computer program product includes one or more computer programs. When loading and executing the computer program on the computer, processes or functions described according to the example of the disclosure are fully or partially generated. The computer may be a general-purpose computer, a dedicated computer, a computer network, or other programmable apparatuses. The computer program may be stored in a computer-readable storage medium or transmitted from one computer-readable storage medium to another. For example, the computer program may be transmitted from a website, a computer, a server or a data center to another website, computer, server, or data center through a wired (such as a coaxial cable, an optical fiber, a digital subscriber line (DSL)) or wireless (such as infrared, wireless, and microwave) mode. The computer-readable storage medium may be any available medium that the computer can access, or a data storage device such as a server or a data center that is integrated by one or more available media. The available medium may be a magnetic medium (such as a floppy disk, a hard drive, and a magnetic tape), an optical medium (such as a high-density digital video disc (DVD)), or a semiconductor medium (such as a solid state disk (SSD)), etc.

Those ordinarily skilled in the art can understand that the first, second, and other numerical numbers involved in the disclosure are merely differentiation for the convenience of description, and are not intended to limit the scope of the example of the disclosure, nor do indicate the sequential order.

At least one in the disclosure can further be described as one or more, and a plurality of may be two, three, four, or more, which is not limited in the disclosure. In the example of the disclosure, for a technical feature, the technical features described in the technical feature are distinguished by "first", "second", "third", "A", "B", "C", and "D", and the technical features described by "first", "second", "third", "A", "B", "C", and "D" have no sequential order or order of size.

The corresponding relationships shown in various tables in the disclosure can be configured or predefined. Values of information in each table are merely examples and can be configured as other values, which is not limited in the disclosure. When configuring the corresponding relationships between the information and various parameters, it does not need to configure all the corresponding relationships shown in each table. For example, in the tables in the disclosure, the corresponding relationships shown in certain rows may not be configured. For another example, appropriate deformation and adjustments, such as splitting and merging, can be made based on the above tables. The names of parameters shown in titles of the above tables may also use other names that can be understood by the communication apparatus, and the values or representations of the parameters may also be other values or representations understood by the communication apparatus. When implementing the above tables, other data structures can also be used, such as an array, a queue, a container, a stack, a linear table, a pointer, a linked list, a tree, a graph, a structure, a class, a heap, a hashing table, or a hash table.

The predefinition in the disclosure may be understood as being defined, pre-defined, stored, pre-stored, pre-negotiated, pre-configured, cured, or pre-fired.

Those ordinarily skilled in the art may realize that, units and algorithm steps of the examples described in the disclosed examples here can be implemented by electronic hardware, computer software, or a combination of the computer software or the electronic hardware. Whether these functions are executed in a mode of hardware or software depends on particular applications and design constraint conditions of the technical solutions. Professional technicians may use different methods to implement the described functions for each particular application, but such implementation is not to be regarded beyond the scope of the disclosure.

Those skilled in the art can clearly understand that, for the convenience and simplicity of description, the specific working process of the above described system, apparatus and unit may refer to the corresponding process in the aforementioned method examples, and will not be repeated here.

The above is merely a specific implementation of the disclosure, but the scope of protection of the disclosure is not limited to this. Any changes or replacements that can be easily thought of by technical personnel familiar with the technical field within the technical scope disclosed in the disclosure needs to be covered within the scope of protection of the disclosure. Thus, the protection scope of the disclosure needs to be subjected to the protection scope of the claims.

An example of the disclosure provides a semi-persistent scheduling (SPS) transmission indication method and apparatus applied to multi-broadcast scheduling (MBS), which can be applied to an evolved NodeB (eNB), a transmission reception point (TRP), a next generation NodeB (gNB) in an NR system, base stations in other future mobile communication systems, or an access node in a wireless fidelity (WiFi) system, etc. By determining an SPS transmission state corresponding to a sub-group to which a terminal device transmission belongs using an SPS transmission instruction sent by a network-side device, a problem that different SPS transmission demands of terminal devices cannot be satisfied can be avoided, thus facilitating improving the efficiency of an SPS transmission in an MBS service and saving resources.

In a first aspect, an example of the disclosure provides a semi-persistent scheduling (SPS) transmission indication method applied to multi-broadcast scheduling (MBS), including:

receiving an SPS transmission indication signaling sent by a network-side device; and obtaining, on the basis of the SPS transmission indication signaling, a terminal device sub-group to which an SPS transmission belongs and an SPS transmission state corresponding to the terminal device sub-group to which the SPS transmission belongs.

By determining the SPS transmission state corresponding to a sub-group to which a terminal device transmission belongs using an SPS transmission instruction sent by the network-side device, a problem that different SPS transmission demands of terminal devices cannot be satisfied can be avoided, thus facilitating improving the efficiency of an SPS transmission in an MBS service and saving resources.

Optionally, the SPS transmission indication signaling is activation signaling, and the activation signaling includes at least one activated SPS configuration index, where each SPS configuration index corresponds to one terminal device sub-group.

Optionally, the method further includes:

receiving, when belonging to the terminal device sub-group to which the SPS transmission belongs, a physical downlink shared channel (PDSCH) of the SPS according to the SPS transmission state corresponding to the terminal device sub-group to which the SPS transmission belongs.

Optionally, the method further includes:

receiving an SPS configuration activation state list configured by the network-side device through radio resource control (RRC) signaling, where a length of the SPS configuration activation state list is L, a length of an HARQ process number (HPN) field in the activation signaling is H, and ceil $(\log_2 L) \leq H$, where the SPS transmission state of the terminal device is configured according to the SPS transmission indication signaling and the SPS configuration activation state list.

Optionally, in response to determining that the network-side device simultaneously activates a plurality of SPS transmissions, and the plurality of SPS transmissions correspond to the same hybrid automatic repeat request process number (HPN) calculated by two or more PDSCHs, the HPNs respectively corresponding to the two or more PDSCHs are determined according to IDs of the terminal device sub-groups respectively corresponding to the two or more PDSCHs.

Optionally, the SPS transmission indication signaling is de-activation signaling, and obtaining, on the basis of the SPS transmission indication signaling, the terminal device sub-group to which the SPS transmission belongs and the SPS transmission state corresponding to the terminal device sub-group to which the SPS transmission belongs includes:

receiving an SPS configuration de-activation state list configured by the network-side device through RRC signaling; and obtaining a terminal device sub-group corresponding to indication information in the de-activation signaling according to the de-activation state list, where the terminal device sub-group corresponding to the indication information in the de-activation signaling is the sub-group to which the SPS transmission belongs.

Optionally, the method further includes:

determining de-activation terminal device sub-group according to the de-activation signaling.

Optionally, the method further includes:

indicating a terminal device sub-group corresponding to a de-activation entry according to a specific information field in the de-activation signaling.

Optionally, the method further includes:

indicating a terminal device sub-group immune to the de-activation entry according to the specific information field in the de-activation signaling.

Optionally, the terminal device sub-group immune to the de-activation entry indicated by the de-activation signaling is: the SPS transmission corresponding to the terminal device sub-group corresponding to de-activation indication information being still in an activated state.

Optionally, the specific information field is an information field being not used for de-activation validation in the de-activation signaling.

In a second aspect, an example of the disclosure provides another semi-persistent scheduling (SPS) transmission indication method applied to multi-broadcast scheduling (MBS), including:

sending an SPS transmission indication signaling to a terminal device, where the SPS transmission indication signaling is used for indicating a terminal device sub-group to which an SPS transmission belongs and an SPS transmission state corresponding to the terminal device sub-group to which the SPS transmission belongs.

By determining the SPS transmission state corresponding to a sub-group to which a terminal device transmission belongs using an SPS transmission instruction sent by a network-side device, a problem that different SPS transmission demands of terminal devices cannot be satisfied can be avoided, thus facilitating improving the efficiency of an SPS transmission in an MBS service and saving resources.

Optionally, the SPS transmission indication signaling is activation signaling, and indication information of the activation signaling includes at least one activated SPS configuration index, where each SPS configuration index corresponds to one terminal device sub-group.

Optionally, the method further includes:

sending an SPS configuration activation state list to the terminal device through RRC signaling, where a length of the SPS configuration activation state list is L, a length of an HARQ process number (HPN) field in the activation signaling is H, and ceil $(\log_2 L) \leq H$.

Optionally, in response to determining that the network-side device simultaneously activates a plurality of SPS transmissions, and the plurality of SPS transmissions correspond to the same hybrid automatic repeat request process number (HPN) calculated by two or more PDSCHs, the HPNs respectively corresponding to the two or more PDSCHs are determined according to sub-group IDs respectively corresponding to the two or more PDSCHs.

Optionally, the SPS transmission indication signaling is de-activation signaling, and obtaining, the method further includes:

sending an SPS configuration de-activation state list to the terminal device through RRC signaling.

Optionally, the indication information in the de-activation signaling is used for de-activating an SPS transmission belonging to a specific sub-group terminal device.

Optionally, the indication information in the de-activation signaling is: a specific information field in the de-activation signaling, where the specific information field is used for indicating a terminal device sub-group corresponding to a de-activation entry or a terminal device sub-group immune to the de-activation entry.

Optionally, the specific information field is an information field being not used for de-activation verification in the de-activation signaling.

Optionally, the terminal device sub-group immune to the de-activation entry indicated by the de-activation signaling is: the SPS transmission corresponding to the terminal device sub-group corresponding to the indication information in the de-activation signaling being still in an activated state.

In a third aspect, an example of the disclosure provides a communication apparatus. The communication apparatus has some or all of the functions of a terminal device for implementing the method described in the first aspect above. For example, the functions of the communication apparatus can have functions in some or all of the examples in the disclosure, or can have the functions of implementing any one of the examples separately in the disclosure. The functions may be implemented by hardware, or may be implemented by executing corresponding software through hardware. The hardware or the software includes one or more units or modules corresponding to the above functions.

In one implementation, a structure of the communication apparatus may include a transceiving module and a processing module, and the processing module is configured to support the communication apparatus in executing the corresponding functions in the above method. The transceiving module is configured to support communication between the communication apparatus and other devices. The communication apparatus may further include a storage module, the storage module is configured to be coupled with the transceiving module and the processing module, and stores needful computer programs and data for the communication apparatus.

As an example, the processing module may be a processor, the transceiving module may be a transceiver or a communication interface, and the storage module may be a memory.

In one implementation, the communication apparatus includes:

- a receiving module, configured to receive SPS transmission indication signaling sent by a network-side device; and
- an obtaining module, configured to obtain, on the basis of the SPS transmission indication signaling, a terminal device sub-group to which an SPS transmission belongs and an SPS transmission state corresponding to the terminal device sub-group to which the SPS transmission belongs.

Optionally, the SPS transmission indication signaling is activation signaling, and the activation signaling includes at least one activated SPS configuration index, where each SPS configuration index corresponds to one terminal device sub-group.

Optionally, the apparatus further includes:

- a first receiving submodule, configured to receive, when belonging to the terminal device sub-group to which the SPS transmission belongs, a physical downlink shared channel (PDSCH) of the SPS according to the SPS transmission state corresponding to the terminal device sub-group to which the SPS transmission belongs.

Optionally, the apparatus further includes:

- a second receiving submodule, configured to receive an SPS configuration activation state list configured by the network-side device through radio resource control (RRC) signaling, where a length of the SPS configuration activation state list is L, a length of an HARQ process number (HPN) field in the activation signaling is H, and ceil $(\log_2 L) \leq H$, where the SPS transmission state of the terminal device is configured according to the SPS transmission indication signaling and the SPS configuration activation state list.

Optionally, the apparatus further includes:

- a first determining submodule, configured to determine, in response to determining that the network-side device simultaneously activates a plurality of SPS transmissions, and the plurality of SPS transmissions correspond to the same hybrid automatic repeat request process number (HPN) calculated by two or more PDSCHs, the HPNs respectively corresponding to the two or more PDSCHs according to IDs of the terminal device sub-groups respectively corresponding to the two or more PDSCHs.

Optionally, the SPS transmission indication signaling is de-activation signaling, and the obtaining module includes:

- a third receiving submodule, configured to receive an SPS configuration de-activation state list configured by the network-side device through the RRC signaling; and
- an obtaining submodule, configured to obtain a terminal device sub-group corresponding to indication information in the de-activation signaling according to the de-activation state list, where the terminal device sub-group corresponding to the indication information in the de-activation signaling is the sub-group to which the SPS transmission belongs.

Optionally, the apparatus further includes:

- a second determining submodule, configured to determine to deactivate the terminal device sub-group according to the de-activation signaling.

Optionally, the apparatus further includes:

- a first indication submodule, configured to indicate a terminal device sub-group corresponding to a de-activation entry according to a specific information field in the de-activation signaling.

Optionally, the apparatus further includes:

- a second indication submodule, configured to indicate a terminal device sub-group immune to the de-activation entry according to the specific information field in the de-activation signaling.

Optionally, the terminal device sub-group immune to the de-activation entry indicated by the de-activation signaling is: the SPS transmission corresponding to the terminal device sub-group corresponding to de-activation indication information being still in an activated state.

Optionally, the specific information field is an information field being not used for de-activation verification in the de-activation signaling.

Optionally, the specific information field is an information field being not used for de-activation validation in de-activation signaling.

In a fourth aspect, an example of the disclosure provides another communication apparatus. The communication apparatus has some or all of the functions of a network device for implementing the method example described in the second aspect above. For example, the functions of the communication apparatus can have functions in some or all of the examples in the disclosure, or can have the functions of implementing any one of the examples separately in the disclosure. The functions may be implemented by hardware, or may be implemented by executing corresponding software through hardware. The hardware or software includes one or more units or modules corresponding to the above functions.

In one implementation, a structure of the communication apparatus may include a transceiving module and a processing module, and the processing module is configured to support the communication apparatus in executing the corresponding functions in the above method. The transceiving module is configured to support communication between the communication apparatus and other devices. The communication apparatus may further include a storage module, the storage module is configured to be coupled with the transceiving module and the processing module, and stores needful computer programs and data for the communication apparatus.

As an example, the processing module may be a processor, the transceiving module may be a transceiver or a communication interface, and the storage module may be a memory.

In one implementation, the communication apparatus includes:

a sending module, configured to send SPS transmission indication signaling to a terminal device, where the SPS transmission indication signaling is used for indicating a terminal device sub-group to which an SPS transmission belongs and an SPS transmission state corresponding to the terminal device sub-group to which the SPS transmission belongs.

Optionally, the SPS transmission indication signaling is activation signaling, and indication information of the activation signaling includes at least one activated SPS configuration index, where each SPS configuration index corresponds to one terminal device sub-group.

Optionally, the apparatus further includes:

a first sending submodule, configured to send an SPS configuration activation state list to the terminal device through RRC signaling, where a length of the SPS configuration activation state list is L, a length of an HARQ process number (HPN) field in the activation signaling is H, and ceil $(\log_2 L) \leq H$.

Optionally, the apparatus further includes:

a determining submodule, configured to determine, in response to determining that the network-side device simultaneously activates a plurality of SPS transmissions, and the plurality of SPS transmissions correspond to the same hybrid automatic repeat request process number (HPN) calculated by two or more PDSCHs, the HPNs respectively corresponding to the two or more PDSCHs according to sub-group IDs respectively corresponding to the two or more PDSCHs.

Optionally, the SPS transmission indication signaling is de-activation signaling, and obtaining, the apparatus further includes:

a second sending submodule, configured to send an SPS configuration de-activation state list to the terminal device through the RRC signaling.

Optionally, the indication information in the de-activation signaling is used for de-activating an SPS transmission belonging to a specific sub-group terminal device.

Optionally, the indication information in the de-activation signaling is: a specific information field in the de-activation signaling, where the specific information field is used for indicating a terminal device sub-group corresponding to a de-activation entry or a terminal device sub-group immune to the de-activation entry.

Optionally, the specific information field is an information field being not used for de-activation validation in the de-activation signaling.

Optionally, the terminal device sub-group immune to the de-activation entry indicated by the de-activation signaling is: the SPS transmission corresponding to the terminal device sub-group corresponding to the indication information in the de-activation signaling being still in an activated state.

In a fifth aspect, an example of the disclosure provides a communication apparatus, including one or more processor, and the one or more processor, when calling a computer program in a memory, executes the method described in the first aspect above.

In a sixth aspect, an example of the disclosure provides a communication apparatus, including one or more processor, and the one or more processor, when calling a computer program in a memory, executes the method described in the second aspect above.

In a seventh aspect, an example of the disclosure provides a communication apparatus, including one or more processor and a memory, and a computer program is stored in the memory. The one or more processor executes the computer program stored in the memory, such that the communication apparatus executes the method described in the first aspect above.

In an eighth aspect, an example of the disclosure provides a communication apparatus, including one or more processor and a memory, and a computer program is stored in the memory. The one or more processor executes the computer program stored in the memory, such that the communication apparatus executes the method described in the second aspect above.

In a ninth aspect, an example of the disclosure provides a communication apparatus, including one or more processor and an interface circuit. The interface circuit is configured to receive code instructions and transmitting the same to the one or more processor, and the one or more processor is configured to run the code instructions, such that the apparatus executes the method described in the first aspect above.

In a tenth aspect, an example of the disclosure provides a communication apparatus, including one or more processor and an interface circuit. The interface circuit is configured to receive code instructions and transmitting the same to the one or more processor, and the one or more processor is configured to run the code instructions, such that the apparatus executes the method described in the second aspect above.

In an eleventh aspect, an example of the disclosure provides a semi-persistent scheduling (SPS) transmission indication system applied to multi-broadcast scheduling (MBS). The system includes the communication apparatus described in the third aspect and the communication apparatus described in the fourth aspect, or the system includes the communication apparatus described in the fifth aspect and the communication apparatus described in the sixth aspect, or the system includes the communication apparatus described in the seventh aspect and the communication apparatus described in the eighth aspect, or the system includes the communication apparatus described in the ninth aspect and the communication apparatus described in the tenth aspect.

In a twelfth aspect, an example of the present disclosure provides a computer-readable storage medium for storing instructions used by the terminal device above. The instructions, when executed, causes the terminal device to execute the method described in the first aspect above.

In a thirteenth aspect, an example of the present disclosure provides a computer-readable storage medium for storing instructions used by the network device above. The instructions, when executed, causes the network device to execute the method described in the second aspect above.

In a fourteenth aspect, the disclosure further provides a computer program product including a computer program. The computer program product, when running on a computer, causes the computer to execute the method described in the first aspect above.

In a fifteenth aspect, the disclosure further provides a computer program product including a computer program. The computer program product, when running on a computer, causes the computer to execute the method described in the second aspect above.

In a sixteenth aspect, the disclosure provides a chip system. The chip system includes at least one processor and an interface, for supporting a terminal device in implementing the functions involved in the first aspect, for example, determining or processing at least one of data and information involved in the above method. In one possible design, the chip system further includes a memory, and the memory is used for storing needful computer programs and data for the terminal device. The chip system may be composed of a chip, and may further include the chip and other discrete devices.

In a seventeenth aspect, the disclosure provides a chip system. The chip system includes at least one processor and an interface, for supporting a network device in implementing the functions involved in the second aspect, for example, determining or processing at least one of data and information involved in the above method. In one possible design, the chip system further includes a memory, and the memory is used for storing needful computer programs and data for the network device. The chip system may be composed of a chip, and may further include the chip and other discrete devices.

In an eighteenth aspect, the disclosure provides a computer program. The computer program, when running on a computer, causes the computer to execute the method described in the first aspect above.

In a nineteenth aspect, the disclosure provides a computer program. The computer program, when running on a computer, causes the computer to execute the method described in the second aspect above.

The invention claimed is:

1. A semi-persistent scheduling (SPS) transmission indication method applied to multi-broadcast scheduling (MBS), performed by a terminal device, comprising:

receiving an SPS transmission indication signaling sent by a network-side device; and obtaining, on the basis of the SPS transmission indication signaling, a terminal device sub-group to which an SPS transmission belongs and an SPS transmission state corresponding to the terminal device sub-group to which the SPS transmission belongs, wherein the SPS transmission indication signaling is de-activation signaling, and obtaining, on the basis of the SPS transmission indication signaling, the terminal device sub-group to which the SPS transmission belongs and the SPS transmission state corresponding to the terminal device sub-group to which the SPS transmission belongs comprises:

receiving an SPS configuration de-activation state list configured by the network-side device through radio resource control (RRC) signaling; and obtaining a terminal device sub-group corresponding to indication information in the de-activation signaling according to the SPS configuration de-activation state list, wherein the terminal device sub-group corresponding to the indication information in the de-activation signaling is the terminal device sub-group to which the SPS transmission belongs.

2. The method according to claim 1, further comprising:

determining a de-activation terminal device sub-group according to the de-activation signaling.

3. The method according to claim 2, wherein the terminal device sub-group immune to a de-activation entry indicated by the de-activation signaling is: the SPS transmission corresponding to the terminal device sub-group corresponding to the indication information in the de-activation signaling being still in an activated state.

4. The method according to claim 1, wherein a specific information field in the de-activation signaling indicates a terminal device sub-group corresponding to a de-activation entry.

5. The method according to claim 1, wherein a specific information field in the de-activation signaling indicates a terminal device sub-group immune to a de-activation entry.

6. A semi-persistent scheduling (SPS) transmission indication method applied to multi-broadcast scheduling (MBS), performed by a network-side device, comprising:

sending an SPS transmission indication signaling to a terminal device, wherein the SPS transmission indication signaling is used for indicating a terminal device sub-group to which an SPS transmission belongs and an SPS transmission state corresponding to the terminal device sub-group to which the SPS transmission belongs, wherein the SPS transmission indication signaling is de-activation signaling, and the method further comprises:

sending an SPS configuration de-activation state list to the terminal device through radio resource control (RRC) signaling, wherein the SPS configuration de-activation state list is used for the terminal device to obtain a terminal device sub-group corresponding to indication information in the de-activation signaling, and the terminal device sub-group corresponding to the indication information in the de-activation signaling is the terminal device sub-group to which the SPS transmission belongs.

7. The method according to claim 6, wherein the indication information in the de-activation signaling is used for de-activating an SPS transmission belonging to a specific terminal device sub-group.

8. The method according to claim 6, wherein the indication information in the de-activation signaling is: a specific information field in the de-activation signaling, wherein the specific information field is used for indicating a terminal device sub-group corresponding to a de-activation entry or a terminal device sub-group immune to the de-activation entry.

9. A communication apparatus, comprising one or more processors and a memory, wherein the memory stores a computer program, and the one or more processors are configured to execute the computer program stored in the memory to cause the communication apparatus to:

receive an SPS transmission indication signaling sent by a network-side device; and obtain, on the basis of the SPS transmission indication signaling, a terminal device sub-group to which an SPS transmission belongs and an SPS transmission state corresponding to the terminal device sub-group to which the SPS transmission belongs, wherein the SPS transmission indication signaling is de-activation signaling, and the one or more processors are further configured to execute the computer program stored in the memory to cause the communication apparatus to:

receive an SPS configuration de-activation state list configured by the network-side device through radio resource control (RRC) signaling; and obtain a terminal device sub-group corresponding to indication information in the de-activation signaling according to the SPS configuration de-activation state list, wherein the terminal device sub-group corresponding to the indication information in the de-activation signaling is the terminal device sub-group to which the SPS transmission belongs.

10. A communication apparatus, comprising one or more processors and a memory, wherein the memory stores a computer program, and the computer program when collectively executed by the one or more processors cause the communication apparatus to execute the method according to claim 6.

11. A communication apparatus, comprising: one or more processors and an interface circuit, wherein the interface circuit is used for receiving code instructions and transmitting the same to the one or more processors; and the one or more processors is or are used for running the code instructions to execute the method according to claim 1.

12. A communication apparatus, comprising: one or more processors and an interface circuit, wherein the interface circuit is used for receiving code instructions and transmitting the same to the one or more processors; and the one or more processors is or are used for running the code instructions to execute the method according to claim 6.

13. A non-transitory computer-readable storage medium, used for storing instructions, the instructions, when executed, causing the method according to claim 1 to be implemented.

14. A non-transitory computer-readable storage medium, used for storing instructions, the instructions, when executed, causing the method according to claim 6 to be implemented.

* * * * *